United States Patent [19]

Ishikawa et al.

[11] 4,133,652
[45] Jan. 9, 1979

[54] ELECTRONIC AIR CONDITIONER

[76] Inventors: Makio Ishikawa, 5-12-2, Kamitakada, Nakano-Ku, Tokyo-To; Hikaru Kanazawa, 5-22-3, Shimoigusa, Suginami-Ku, Tokyo-To, both of Japan

[21] Appl. No.: 749,436

[22] Filed: Dec. 10, 1976

[30] Foreign Application Priority Data

May 25, 1976 [JP] Japan .............................. 51-66900[U]

[51] Int. Cl.² .................................................. B03C 3/32
[52] U.S. Cl. ........................................ 55/126; 55/138; 55/269; 55/279; 55/414; 422/4
[58] Field of Search .......... 55/124, 126, 134, 135–138, 55/269, 279, 316, 318, 128, 414; 21/74 R, 74 A, 102 R

[56] References Cited

U.S. PATENT DOCUMENTS

| 2,786,544 | 3/1957 | Connor | 55/135 |
|---|---|---|---|
| 2,825,102 | 3/1958 | Hicks et al. | 55/279 |
| 3,172,747 | 3/1965 | Nodolf | 55/126 |
| 3,191,362 | 6/1965 | Bourgeois | 55/126 |
| 3,344,061 | 9/1967 | Kellom | 55/279 |
| 3,700,029 | 10/1972 | Thrun | 55/269 |
| 3,804,942 | 4/1974 | Kato et al. | 55/126 |
| 3,844,741 | 10/1974 | Dimitrik | 55/138 |
| 3,930,818 | 1/1976 | McDougall | 55/414 |
| 3,988,131 | 10/1976 | Kanazawa et al. | 55/126 |

FOREIGN PATENT DOCUMENTS

| 1379817 | 10/1964 | France | 55/124 |
|---|---|---|---|
| 48-127576 | 11/1973 | Japan | 55/269 |

Primary Examiner—Frank W. Lutter
Assistant Examiner—David L. Lacey
Attorney, Agent, or Firm—Robert E. Burns; Emmanuel J. Lobato; Bruce L. Adams

[57] ABSTRACT

An electronic air conditioner, in which a charging section, a dust collecting section (including an electrostatic dust collecting section and an ozone reducing section) and a negative ion generating section, known per se, are arranged in this order along the flow path of air extending from the air inlet to the air outlet in a casing of insulating material to provide a compact electronic air conditioner capable of air hearing, air cooling and air cleaning. At an appropriate position between the air inlet and the air outlet in the casing, a fan is provided to cause a flow of air. Between a mechanical filter provided at the air inlet and the negative ion generating section, a heat exchanger is provided to act on the flow of air for heating or cooling the same. The endothermic-and-thermoradiation fins of the heat exchanger can be also used as a dust collector if grounded.

3 Claims, 3 Drawing Figures

ELECTRONIC AIR CONDITIONER

FIELD OF THE INVENTION

This invention relates to an electronic air conditioner, and more particularly to a compact electronic air conditioner capable of heating or cooling and cleaning air.

BRIEF DESCRIPTION OF THE PRIOR ART

A conventional air conditioner of the type comprises a blower or a fan for introducing the external air in a casing from its air inlet through a mechanical filter to send it out from its air outlet, and a heat exchanger seated in the casing for cooling or heating the air when passing through the casing. At the air outlet, a grid or grill-like diffuser is usually provided, and in such a device the fan may be provided before or after the heat exchanger.

In the conventional electronic air cleaner, the flow of air is fed through a charging section, an electrostatic dust collecting section and an ozone reducing section, i.e. a chemical filter. Moreover, the air cleaner has a high voltage generating section for supplying a high voltage to the charging section to charge the dust particles in the air, so that the charged dust particles are arrested at the electrostatic dust collecting section. The chemical filter or an ozone reducing section eliminates the remaining harmful substances in the air to obtain the cleaned air. The air cleaner further has a section in which negative ions generated at a negative ion generator are mixed with the cleaned air before sending out from the air outlet. The charging section and the dust collecting section may either be arranged in succession along the flow path of air so that they are assembled in a unit, or separately seated. The charging section, the dust collecting section (formed by the electrostatic dust collecting section and the ozone reducing section) and the negative ion generating section must be arranged in this order, and this arrangement order can't be changed.

Recently, need for air conditioners rapidly increases in various places including factories, offices, vehicles and even in residential buildings. However, many of those places are now equipped with several different single function apparatus such as an air cooler, an air heater and an air cleaner, and one of them is selectively activated according to the requirement. The air conditioning in such a manner has losses of occupied spaces, materials and power consumption, and entails much expense for the equipment.

Moreover, single air conditioners each capable of both heating and cooling air, such air conditioner each further having a moisture removing function, and either of above air conditioners each further equipped with an air cleaning mechanism have been on the market. However, those air conditioners are difficult to be installed at a place where the space and/or power consumption is severely restricted. Especially for use in a vehicle such as a car, a small, light and inexpensive apparatus having functions described above is needed, but this has not yet been developed by this time.

BRIEF SUMMARY OF THE INVENTION

An object of the present invention is to provide, a very compact electronic air conditioner in which the cooler function, the heater function and the air cleaner function are integrated.

The air conditioner of this invention is a combination of an air conditioner and an electronic air cleaner, known per se, in which either one of such duplex mechanisms as mechanical filters, fans, high voltage generating sections is eliminated to obtain a small, light and inexpensive apparatus, though they are indispensable when the air conditioner and the air cleaner are independently provided.

BRIEF DESCRIPTION OF THE DRAWINGS

The principle, construction and operation of the present invention will be clearly understood from the following detailed description taken in conjunction with the accompanying drawings, in which.

DETAILED DESCRIPTION OF THE INVENTION

Figure 1:
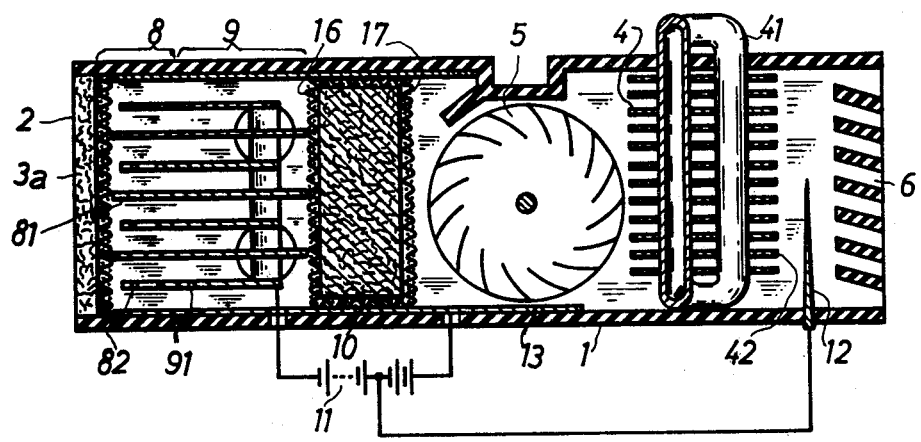
FIGS. 1 and 3 show cross sectional views each illustrating an embodiment according to the present invention.

With reference to FIG. 1, an embodiment of this invention will be described. In FIG. 1, a space is provided between a fan 5 and a mechanical filter 3a in the conventional air conditioner, which comprises an air inlet 2, the mechanical filter 3a, the fan 5, a heat exchanger 4, and a diffuser 6, which are arranged in this order in a casing 1 of insulating material. In the space, a conventional charging section 8 (formed by grounded electrodes 81 and high voltage thin-wire electrodes 82 positioned at both sides of each electrode 81), a conventional dust collecting section (formed by an electrostatic dust collecting section 9 with negative electrodes 91 and grounded electrodes 81, which are alternatively arranged in parallel, and an ozone reducing section 10) are associated with one another in a unit, and a negative ion generator 12 of a needle shaped electrode is placed between the heat exchanger 4 and the diffuser 6. A high voltage supply 11 has a positive grounded electrode, connected to the electrode 13 inside the casing 1 and the grounded electrode 81, and a negative electrode connected to the plate electrode 91, the thin-wire electrode 82 and the negative ion generating needle electrode 12 in accordance with the known electronic air cleaning technique. After the mechanical filter 3a and around the ozone reducing section or chemical filter 10, grounded or protection nets 16 and 17 are provided. The heat exchanger 4 is formed by a known heat guiding conduit 41 led into the casing 1 and endothermic-and-thermoradiation fins 42 which are thermo-conductively coupled with the conduit 41. The diffuser 6 must be made of electrically nonconductive materials such as plastic so as not to arrest negative ions.

The embodiment illustrated in FIG. 1 and stated above can be explained as follows from another point of view. In the air conditioner of the present embodiment shown in FIG. 1, a heat exchanger 4 is placed after the fan 5 and before the negative ion generating section 12 in the conventional electronic air cleaner, which comprises the mechanical filter 3a, the charging section 8, the electrostatic dust collecting section 9, the ozone reducing section or chemical filter 10, the fan 5, the negative ion generating section 12, and the diffuser 6 arranged in this order from the air inlet toward the air outlet. Instead of the arrangement mentioned above, the fan 5, may be placed at any suitable position between the air inlet 2 and the air outlet 7, for example, between the mechanical filter 3a and the changing section 8, between the charging section 8 and the dust collecting section 9, between the heat exchanger 4 and the negative ion generating section 12 or between the negative ion generating section 12 and the air outlet 7. The heat exchanger 4 can be placed at any position between the air inlet and the negative ion generating section; e.g., between the mechanical filter 3a and the charging section 8, between the charging section 8 and the dust collecting section (the dust arresting section 9 and the ozone reducing section 10), etc. Other possible arrangements of element sections are as follows: If reference characters IN, CH, D, IG, HT and OUT are respectively indicative of the air inlet, the charging section, the dust collecting section, the negative ion generating section, the heat exchanger, and the air outlet, each mark * indicates a position where the fan 5 can be placed.

IN-*-HT-*-CH-*-D-*-IG-*-OUT

IN-*-CH-*-HT-*-D-*-IG-*-OUT

These arrangements, however, have a defect such that the heat exchanger 4 attracts and retains dust particles and readily becomes dirty, because the air introduced from the air inlet 2 will not have been sufficiently cleaned when passing through the heat exchanger. However, these arrangements are practicable in adding an air cleaning device to the existing air conditioner, or an air conditioning device to the existing air cleaner.

The best of the various possible arrangements according to this invention is the one where the heat exchanger 4 is positioned after the dust collecting section and before the negative ion generating section 12 as shown in FIG. 1. If such arrangement is adopted and if the charging section 8 and the dust collecting section 9 are formed into a removable cassette which is convenient for occasional washing and cleaning, the heat exchanger 4 will be free from dirt so that overall maintenance of the air conditioner can be readily carried out.

When the air conditioner is applied for use in a car where the location is severely restricted, it should be considered that the heat exchanger 4 and the dust collecting section 9 share a single section. The arrangement of sections, in such a case, can be expressed as follows, using the same mark and characters as mentioned before.

IN-*-CH-*-D.HT-*-IG-*-OUT

Figure 2:
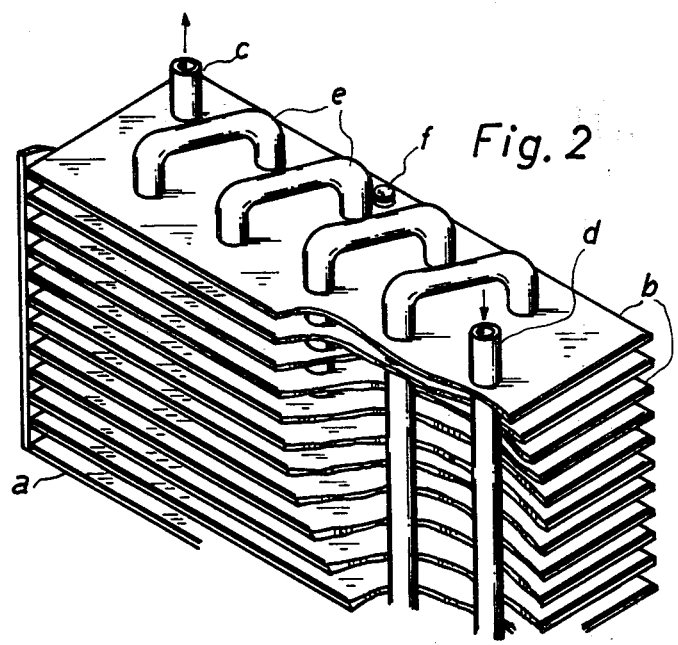
FIG. 2 is a perspective view including partially cut component parts illustrating a member capable of both electrostatic dust collecting and heat exchanging.

The structure using a common section both for heat exchanging and for dust collecting has been already proposed by one of the present inventors (Japanese Utility Model Filling No. 48-127576), and the perspective view of a portion of its structure is illustrated here in FIG. 2. This structure comprises: a metallic casing a, fins b forming many shelves in the casing a and acting both as a dust collector and as a thermoradiation-and-endothermic mechanism, a number of pipes e in which heat carrying medium flows to exchange heat, and a ground terminal f. The device of this structure is used in such a manner that the terminal f is grounded, a heat carrying medium is fed from the lead-in pipe d and is taken out from the lead-out pipe c, and the air is directed to pass through the fins b after passing through the charging section 8. Thus, the device with its fins b can eliminate the charged dust particles in the air as well as heating or cooling the air.

Figure 3:
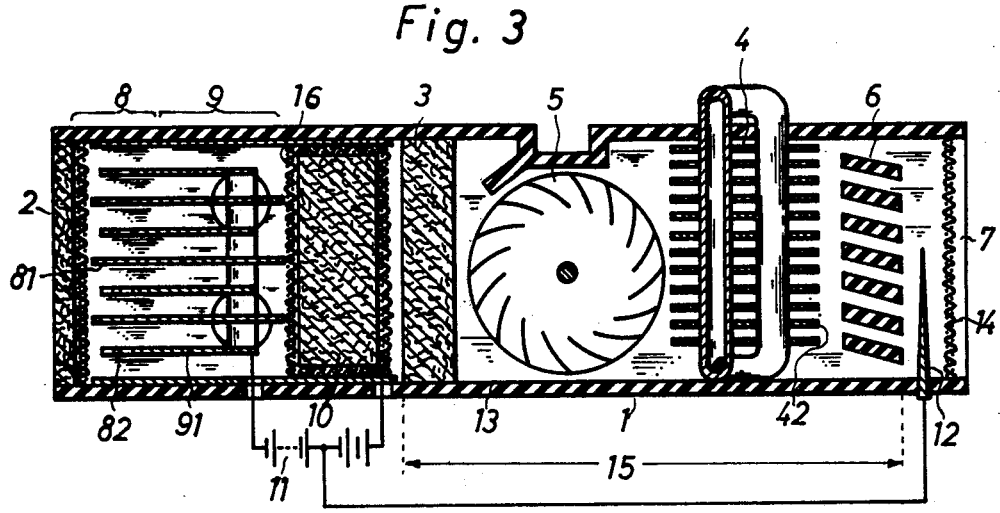

FIG. 3 shows another embodiment of this invention, in which an air cleaning mechanism is newly appended to a conventional air heating-cooling apparatus which is now under operation or designed in accordance with conventional techniques. In FIG. 3, the part 15 including the mechanical filter 3, the fan 5, the heat exchanger 4 and the diffuser 6 is the existing conventional air conditioner. In the present example, a charging section 8, a dust collecting section 9 and a chemical filter 10 are added to the input of the existing air conditioner and a negative ion generating section 12 to its output. Favorably, a mechanical filter 3a is newly provided before the charging section 8, while the existing mechanical filter 3 is removed. Since the negative ion generating section 12 is provided after the diffuser 6, a high voltage protection net 14 of electrically non-conductive material must be added after the ion generating section 12.

As described above, in accordance with the present invention, the electronic air conditioner has a charging section, a dust collecting section and a negative ion generating section arranged in this order along the flow path of air flow extending from the air inlet to the air outlet in the casing. Since the present electronic air conditioner further has a heat exchanger located at an appropriate position between the air inlet and the negative ion generating section, and a fan located at an appropriate position between the air inlet and the air outlet in order to set up the flow of air, it can attain both functions of air conditioning and air cleaning. Nevertheless, the air conditioner is small, light, and inexpensive because of the elimination of duplicated sections.

What we claim is:

1. An electronic air conditioner comprising:
   an insulated casing having an air inlet and an air outlet;
   a mechanical filter provided at the air inlet in said casing;
   a charging section, electrostatic dust collecting section, ozone reducing section and a negative ion generating section, arranged in this order between the mechanical filter and the air outlet of said casing;
   a high voltage source and connecting means for connecting said high voltage source to apply a negative high voltage to each of said charging section, said electrostatic dust collecting section and said negative ion generating section;
   a fan located at a position between said air inlet and air outlet of said casing in order to cause a flow of air from the air inlet to the air outlet;
   a heat exchanger placed between said ozone reducing section and negative ion generating section for exchanging heat with the flow of air in the casing, and said heat exchanger including means for extracting heat from air flowing through said casing; and
   an electrically non-conductive diffuser positioned at the air outlet of said casing downstream from said negative ion generating section.

2. An electronic air conditioner according to claim 1, in which said heat exchanger includes endothermic-and-thermoradiation fins of electrically conductive material maintained at earth potential for acting as a dust collector.

3. An electronic air conditioner according to claim 1, in which said fan is positioned after said heat exchanger.